UNITED STATES PATENT OFFICE.

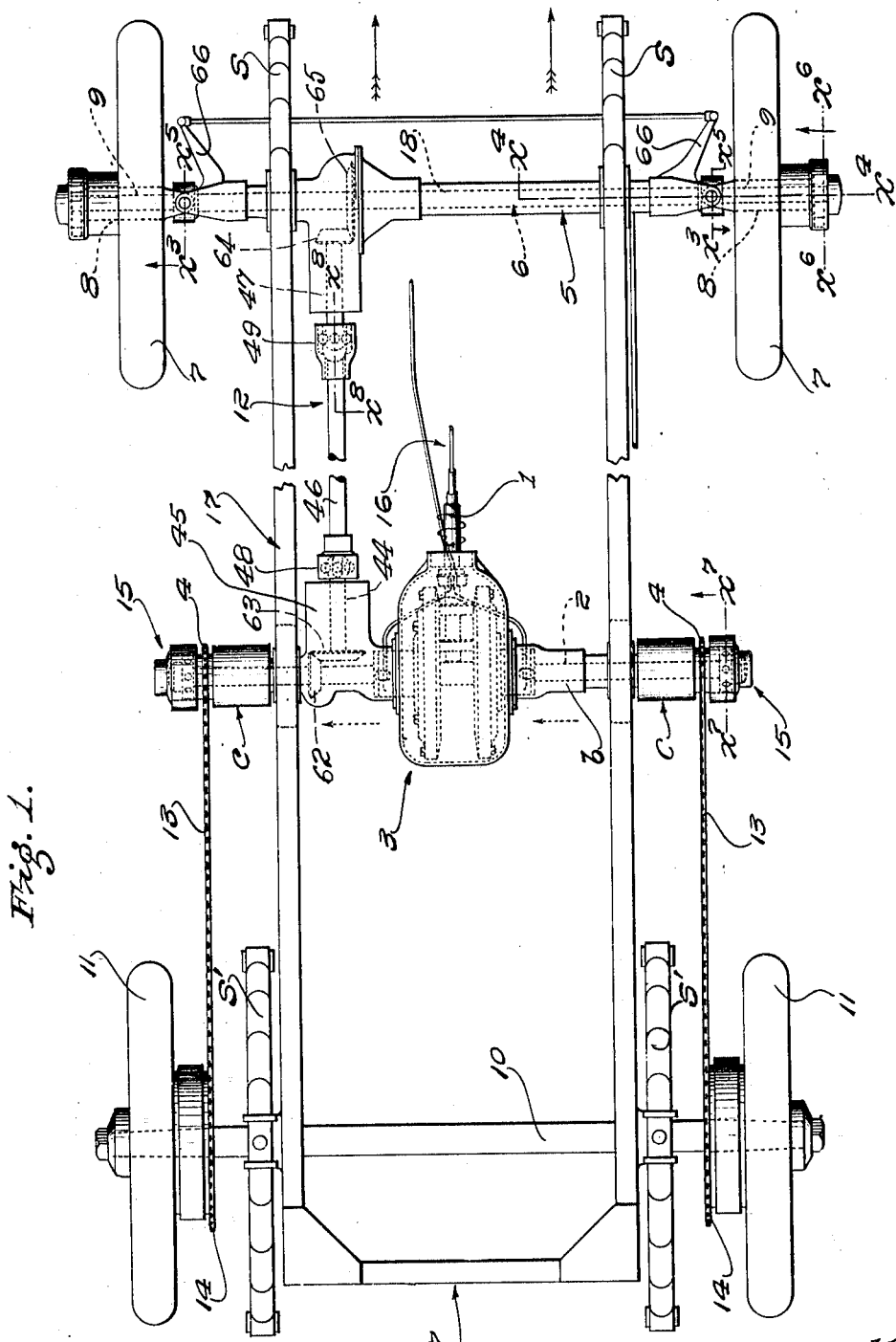

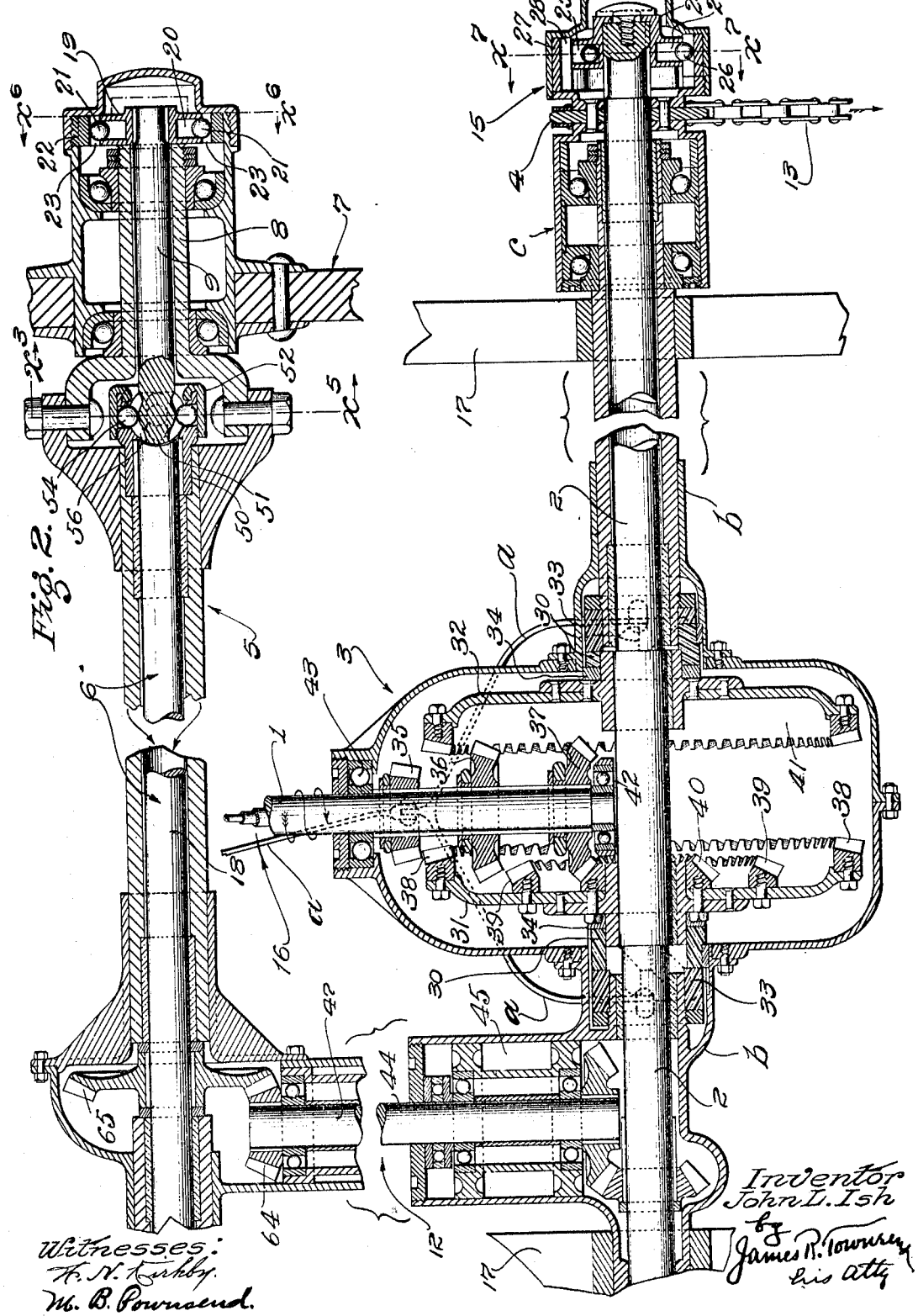

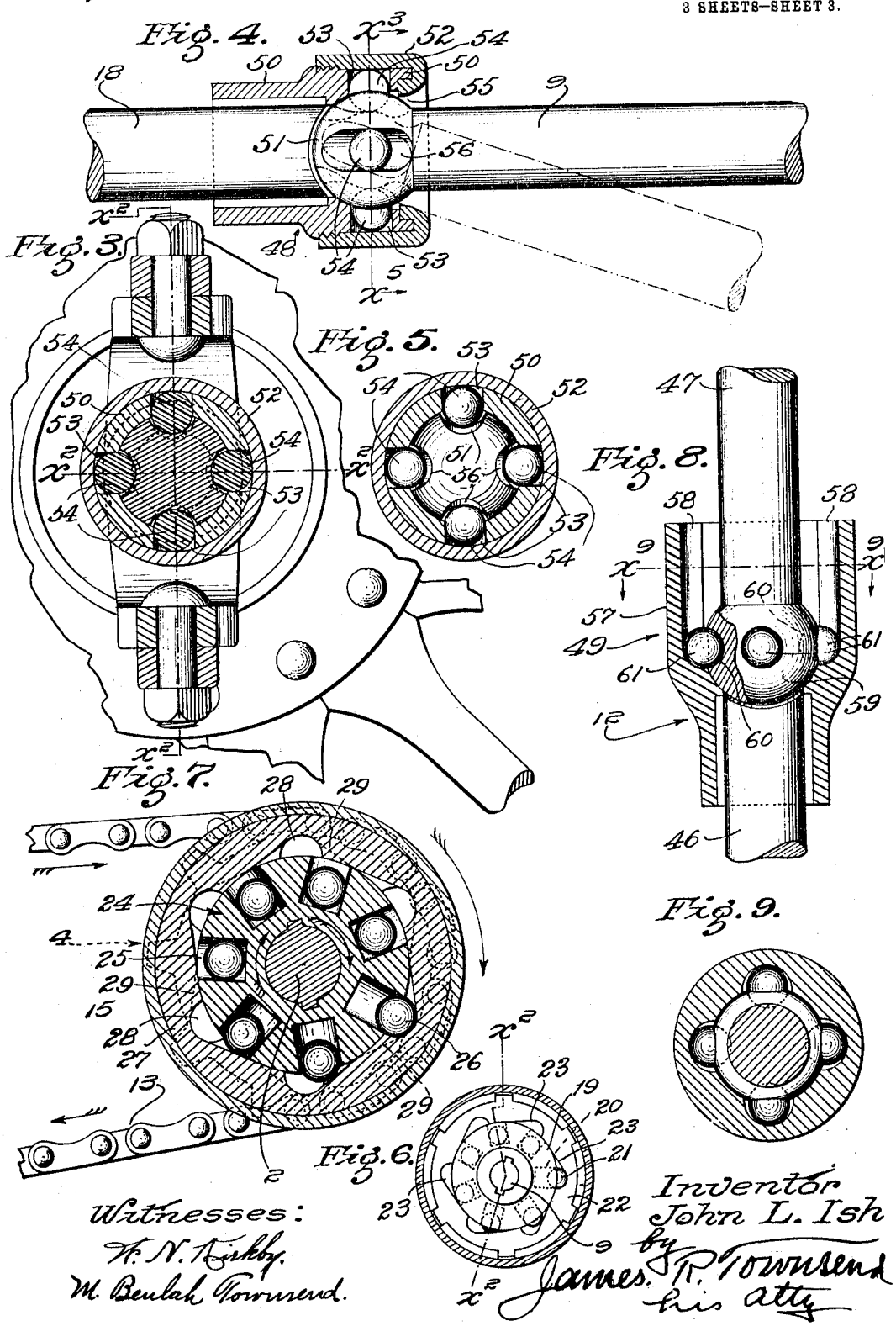

JOHN L. ISH, OF RAND, COLORADO.

TRANSMISSION MECHANISM.

982,501.  Specification of Letters Patent. Patented Jan. 24, 1911.

Application filed November 6, 1907. Serial No. 401,039.

*To all whom it may concern:*

Be it known that I, JOHN L. ISH, a citizen of the United States, a resident of Rand, in the county of Larimer and State of Colorado, temporarily residing at Los Angeles, in the county of Los Angeles and State of California, have invented new and useful Transmission Mechanism, of which the following is a specification.

An object of this invention is to provide for automobiles, motor trucks, motor cars and like vehicles, a practical four wheel drive, in which the power is transmitted to the ground wheels of the car from the driving shaft of a prime mover, as an internal combustion or steam engine carried by the spring-supported body or frame of the car; the means for transmitting the power being highly antifriction and simple and strong and not liable to get out of order or to readily break; at the same time allowing the power to be transmitted with small frictional loss regardless of the relative positions of the wheels in turning the vehicle at corners and elsewhere.

An object is to provide a four-wheel drive for motor cars, motor-trucks, and the like which has superior features as to simplicity, strength, lightness, and direct application of power with minimum friction and wear.

In carrying out the invention I employ novel forms of universal joint as parts of my invention, the same being constructed to afford superior torsional strength, extensibility and flexibility with a given weight of metal; and at the same time to afford ball-bearings for the joints; thus to minimize the friction.

The accompanying drawings illustrate the invention.

Figure 1 is a fragmental plan of the invention as applied in an automobile, or motor car, some of the parts, also the body of, and the motor for, the car being omitted. Fig. 2 is a fragmental axial section partly in a horizontal, and partly in a vertical plane, showing at the right of the view parts of the invention that are duplicated by portions of the device that are broken away and omitted from the left of the view. The parts of the view connected by braces are in plan section, and the portion of the view shown at the upper right-hand corner and connected by arrows with the rest of the view, is in sectional elevation relatively displaced, and illustrates one of the flexible joints of the front axle and shaft. The horizontal line $x^2$—$x^2$, Fig. 3, indicates the plane of horizontal section, and the vertical lines $x^2$—$x^2$, Figs. 3 and 6 indicate the plane of vertical section. Fig. 3 is a fragmentary elevation in transverse section on line indicated by $x^3$—$x^5$, Figs. 1, 2 and 4; showing the construction of the flexible joint of the front axle and shaft. Fig. 4 is a detail of a flexible joint for the front axle. Fig. 5 is a section on line indicated by $x^3$—$x^5$, Figs. 1, 2 and 4; the head and balls of the joint being intact. Fig. 6 is a sectional detail on plane indicated by $x^6$—$x^6$, Figs. 1 and 2. Fig. 7 is a sectional detail on line $x^7$—$x^7$, Figs. 1 and 2. Fig. 8 is a broken, sectional detail of the universal slip-joint in the connection between the driving shaft and the front axle. Fig. 9 is a section on line indicated by $x^9$—$x^9$, Fig. 8.

1 is a driving shaft; 2, an axially-shiftable driven shaft. 3 designates variable speed transmission gearing intermediate said driving shaft and said driven shaft. 4 designates power-transmitting sprocket wheels loose on said driven shaft. In a general way 5 designates a jointed axle, and 6 a jointed shaft inside said axle, said axle forming a casing for said shaft. 7 designates ground wheels mounted on knuckles or end sections 8 of said axle, and surrounding and connected with end sections 9 of said jointed shaft. 10 is another axle, and 11 ground wheels journaled thereon. The jointed axle 5 is the front axle, and the other axle 10 the rear axle of the automobile or motor car.

12 in a general way designates means for connecting the driven shaft 2 with the jointed shaft 6.

13 and 14 designate means for connecting the power-transmitting wheels 4 with the ground wheels 11; 14 representing sprocket wheels fixed to the ground wheels 11, and 13 representing sprocket-chains connecting the power-transmitting sprocket wheels 4, with the sprocket wheels 14.

15 in a general way designates means controllable by the axial shifting of the driven shaft 2 for clutching the power-transmitting sprocket wheels 4.

16 in a general way designates means for controlling the variable speed mechanism 3.

17 in a general way designates the car, the springs and a portion of the frame of which are shown.

It is to be understood that the driving shaft 1 is connected with the engine, not shown, of the motor car. The driving shaft 1 together with the variable speed transmission mechanism 3 and the driven shaft 2, are mounted on the frame of the car-body, and this is likewise true of the means 16 for controlling said variable speed mechanism.

The jointed rotatable shaft 6 consists of a swiveled section 9 and a rotatable section 18 and is carried by the jointed axle 5 which supports the front springs s of the car.

19 designates pocketed drums fixed to the outer ends of the end sections 9 of the jointed rotatable shaft and provided with a plurality of pockets 20 in which, means, in the form of balls 21, are carried for clutching the wheels 7 through the medium of notched ratchet collars 22 of said wheels, the notches 23 of which collars, gradually deepen outwardly and terminate abruptly at one end, so that when the wheel rotates in one direction, relative to the shaft any ball that enters a notch will ride on the incline, thus allowing free rotation of the wheel, and when the shaft rotates to overtake the wheel the ball will engage between the abrupt end of the notch and the wall of its pocket, thus to drive the wheel so long as the tendency of the shaft to rotate is greater than that of the wheel. The driven shaft 2 is likewise provided with pocketed drums 24 having pockets 25 for balls 26 that engage reversely-notched collars 27 having forwardly and rearwardly directed driving notches 28 and 29 in parallel planes for alternately driving the rear ground wheels 11 forwardly or rearwardly as occasion requires.

Each ratchet collar 22 is arranged to be clutched to its shaft section 9 whenever the jointed shaft tends to rotate at higher speed than the wheel 7, and to become released when the tendency of the wheel is to rotate at greater speed than the shaft, thus to compensate for difference of speed between outside and inside front wheels in turning a corner.

Means are provided for shifting the driven shaft 2 axially to bring the balls 26 of its drum 24 into clutching position to drive the power transmitting sprocket wheels 4 in one and the other direction to propel the rear ground wheels 11 and the car forward or backward as may be required.

By reference to Figs. 2 and 7 it may be seen that when the shaft 2 is shifted to the right, as in Fig. 2, a ball 26 will engage the abrupt end of a ratchet notch 28 whenever the tendency of the driven shaft 2 to rotate in the direction of the curved arrow, is greater than that of the wheel 4 that is connected by the sprocket chain 13 with the rear ground wheel 11 that is to be driven to propel the car forward; and that in case the wheels 11 tend to run faster than the shaft 2, the balls will ride on the sloping floors of the notches, thus allowing for difference of speed in turning a corner while the car is running forward. By shifting the shaft 2 to the left in Fig. 2, the balls are brought into position to engage the notches 29 to drive the wheels 11 backward, and to allow either or both of them to rotate backward at a greater speed than that of the driven shaft.

The means for shifting the driven shaft 2 endwise comprises two cams in the form of notched collars 30 within which the shaft 2 rotates freely, and which are mounted to partially rotate outside two variable speed transmission gear disks 31, 32, that are fixed to the driven shaft 2 to transmit motion to said shaft from gear wheels of the driving shaft 1.

Each of the cams 30 is mounted between a disk and a stationary cam 33 one on one side and the other on the other side of the variable speed transmission gear 3 and said cams 30 are adapted to act on antifriction thrust rings 34 that engage the disks 31 and 32 to shift the same and the driven shaft 2 laterally of the driving shaft 1 and its gear wheels 35, 36, 37, thus to bring the required gear disk 31 or 32 into position to receive power from a gear wheel for forward or rearward propulsion. The gear wheels 35, 36 and 37 are shiftable into and out of position for engagement with toothed faces of said disks.

The forward drive disk 31 is provided with three annular toothed faces 38, 39, 40 to engage the gear wheels 35, 36, 37, respectively for low, intermediate and high speed, while the rear drive disk 32 has a single annular toothed face 41 to engage the low speed gear wheel 35.

The gear wheels 35, 36, 37 are splined on the driving shaft and are separately shiftable thereon by connections 16 so that any one of them may be brought into and the others out of position for engagement with the forward drive gear disk, and the low speed gear wheel 35 may be brought into position for engagement with the rearward drive disk 32.

The cams 30 may be simultaneously rotated the space of a tooth by means a and are so arranged that the teeth of the cam on one side of the disks will interlock when the teeth of the cam on the other side of said disks are forced out of interlocking position, and vice versa. This shifts the shaft axially at the same time the disks shift and consequently brings the balls 26 of the drums 24 into first one and then the other of the notches 28, 29 of the collars 27. The parts are so arranged that when the shaft 2 is in position to cause engagement of an annular toothed face of the forward drive disk 31 with a gear wheel of the driving shaft, the balls 26 are in position to engage the forward drive notches 28; and when the shaft is shifted to cause engagement of the rearward drive disk 32 with the gear wheel 35 the balls 26 are brought into position to engage the rearward drive notches 29.

b designates casing for the driven shaft and the variable speed transmission gears,— the same being fixed to the vehicle body or frame 17 and supporting the shaft 2 through the medium of antifriction bearings c, the driving shaft 1 through antifriction bearings 42, 43 and the extensible shaft section 44 through antifriction bearings 45.

The power transmitting means or connection 12 consists in a universally jointed extensible shaft formed in three sections 44, 46 and 47 connected by universal joints 48 and 49 respectively, the former corresponding in construction to the universal joint shown in Fig. 4, and the latter corresponding to the slip joint shown in Fig. 8. In this universal joint as shown in Figs. 3, 4 and 5, 50 is a pocketed cup fixed on the end of the shaft marked 18, in Fig. 4.

51 is a grooved spherical head on the shaft section, marked 9, in Fig. 4.

52 is a cap screwed onto the cup 50 and closing the outer ends of the pockets 53 to retain antifriction power-transmitting balls 54 and provided with an internal lip 55 to retain the head 51 which is provided with grooves 56 that extend longitudinally of the shaft and receive portions of the balls 54 so that said balls extend across the joint between the head and the cup and prevent rotation of the headed shaft section 9 relative to the cup 50 and the shaft section 18; while, at the same time, either of the two shafts may be deflected from axial alinement with the other as indicated by dotted lines in Fig. 4.

By this arrangement a part of the flexible rotary power transmitting means between the driven shaft and the jointed rotary shaft 6 is perfected. Further provision for flexibility and also for extensibility is made by means of the slip joint shown in Figs. 8 and 9 in which the cup 57 on the end of shaft section 46 is provided with grooves 58 that extend longitudinally relative to the shaft 46, and said shaft section 47 has a spherical head 59 provided with concave pockets 60 that seat balls 61 which extend across the joint formed between the perimeter of the head 59 and the inside wall of the cup 57, thus to allow relative deflection and endwise shifting of the sections 46 and 47, but at the same time preventing rotative movement of one section relative to the other.

62, 63, 64 and 65 designate bevel gears for transmitting rotary movement from the driven shaft 2 to the extensible flexible shaft and thence to the jointed rotary shaft.

In practice, the car-frame 17 is carried by the springs s, s', which are carried by the front and rear axles 5 and 10 in the usual way, and the engine, the shaft 1 of which is shown in Figs. 1 and 2, together with the variable speed transmission gear 3 and driven shaft 2, is carried by the frame 17 between which and the axles 5 and 10 there occurs in the ordinary course of travel, a relative up-and-down movement and more or less deflections in other directions. All these movements are accommodated by the flexible and extensible transmitting means 12, and power is thereby transmitted from the driven shaft to the jointed shaft 5, and the wheels 7 simultaneously driven forward in any direction so long as the tendency of the wheels to rotate is less than that of the shaft 6; but by reason of the ratchet connections said wheels are free to rotate independently of the shaft 6 or of each other. At the same time, the shaft 2 drives the rear wheels 11, either or both of which may rotate at accelerated speed without interference with the speed of the driven shaft or of each other. By shifting the driven shaft to the left, and throwing the rear drive gear-wheel 35 into mesh with the rear drive disk 32, the motion of shaft 2 is reversed and the power is then transmitted to the rear wheels to drive the same backward, and at the same time the front axle 6 is driven backward, thus allowing the front wheels to run backward in accordance with the wheels 11, and in turning a curve the inside one of the wheels 7 may lag behind, and the outside one of the wheels 11 may speed ahead of the shaft 2, thus to compensate for difference of distance to be traveled by the wheels on the opposite sides of the vehicle in the act of turning.

The shaft sections 9 are dirigible by means of the knuckle sections 8 controlled by the connected levers 66 which may be operated by the usual means, not shown, under the control of the driver of the car.

I claim:—

1. A driving shaft, an axially-shiftable driven shaft, variable speed transmission gearing intermediate said driving shaft and said driven shaft, power-transmitting wheels loose on said driven shaft, a jointed axle, a jointed shaft inside said axle, wheels mounted on sections of said axle and surrounding and connected with sections of said shaft, another axle, wheels journaled thereon, means for connecting said driven shaft with said jointed shaft, means connecting said power-transmitting wheels with the wheels of said other axle, and means controllable by the axial shifting of said driven shaft for clutching said power-transmitting wheels to transmit power to said wheels of said other axle in either a forward or rearward direction.

2. A driving shaft, an axially-shiftable driven shaft, variable speed transmission gearing intermediate said driving shaft and said driven shaft, power-transmitting wheels loose on said driven shaft, means for clutching said power-transmitting wheels with said driven shaft, rotatable shaft sections, wheels surrounding and connected with said sections, an axle, wheels journaled thereon, means for transmitting power from said driven shaft to said rotatable shaft sections, means for transmitting power from said power-transmitting wheels to said journaled wheels, and means for controlling said clutching means.

3. A rotatable shaft, a casing therefor, wheels loose on said casing, means for connecting said wheels with said shaft, an axle, wheels thereon, a shiftable driven shaft intermediate said rotatable shaft and said axle, means connected to transmit power from said driven shaft to said rotatable shaft and to the wheels of said axle, said connected means being controllable by the shifting of said driven shaft whereby to impart movement in either a forward or a rearward direction, and transmission gearing in operative relation to said driven shaft for driving the same.

4. The combination with a driving shaft, of a plurality of gears shiftably mounted thereon, means for shifting said gears with respect to said driving shaft, a driven shaft, gears on said driven shaft, sprockets on said driven shaft, means for shifting said driven shaft and the gears mounted thereon for causing rotation and reversal of said sprockets, a rotatable shaft, sections jointed thereto, wheels on said sections, an axle, wheels journaled thereon, means for connecting said rotatable shaft with the driven shaft, and the wheels of said axle with the sprockets on said driven shaft.

5. A driving shaft, a driven shaft, drums on said driven shaft having rows of peripheral pockets, sprockets loose on said drums, means carried by said pockets for locking said sprockets on said drums in a forward or rearward direction, a rotatable jointed shaft, wheels loose thereon, means for locking said wheels on said shaft, an axle, wheels journaled thereon, means for transmitting motion from said driven shaft to said rotatable shaft, and means for transmitting motion from said sprockets to the wheels of said axle.

6. The combination with a driving shaft and a driven shaft, of variable speed transmission gearing mounted intermediate said driving shaft and said driven shaft, sprockets loose on said driven shaft, a jointed shaft, wheels loose thereon, an axle, wheels journaled thereon, an extensible shaft and gearing connecting said driven shaft with said jointed shaft, means connecting the sprockets with the wheels of said axle, and means for locking said sprockets on said driven shaft only when the speed of the driven shaft tends to exceed the speed of the sprockets.

7. The combination with a hollow axle, of a jointed sectional and rotatable shaft, drums on the ends thereof, wheels loosely journaled on the drums, clutching chambers in said drums, balls in said chambers adapted to lock the wheels to said drums when the wheel is rotating faster than the axle, another axle, wheels journaled on said axle, a driven shaft intermediate said rotatable shaft and said other axle, and connected to transmit power to said rotatable shaft and to the wheels on said other axle, and means for driving said driven shaft.

In testimony whereof, I have hereunto set my hand at Los Angeles California this 30th day of October 1907.

JOHN L. ISH.

In presence of—
ANTON GLOETZNER,
JAMES R. TOWNSEND.